US006074587A

United States Patent [19]

[11] Patent Number: 6,074,587

[45] Date of Patent: Jun. 13, 2000

Liu et al.

[54] DEGRADABLE CONTAINER AND A METHOD OF FORMING SAME

[75] Inventors: Qiang Liu; Jun Wang; Zhengchu Bin; Chuxun Lu; Xiangshan Ding, all of Zhuzhou, China; Kam Pui Tang, Yuen Long, The Hong Kong Special Administrative Region of the People's Republic of China

[73] Assignee: CS Enviromental Technology Ltd., The Hong Kong Special Administrative Region of the People's Republic of China

[21] Appl. No.: 09/023,123

[22] Filed: Feb. 13, 1998

[51] Int. Cl.[7] .................... B29C 43/14

[52] U.S. Cl. .................... 264/112; 264/115; 264/120

[58] Field of Search .................... 264/112, 115, 264/120

[56] References Cited

U.S. PATENT DOCUMENTS

| | | | |
|---|---|---|---|
| 5,376,320 | 12/1994 | Tiefenbacher et al. | 264/50 |
| 5,378,418 | 1/1995 | Berger et al. | 264/83 |
| 5,411,691 | 5/1995 | Hwang | 264/115 |
| 5,498,384 | 3/1996 | Volk et al. | 264/122 |
| 5,607,983 | 3/1997 | Chi et al. | 521/84.1 |
| 5,664,366 | 9/1997 | Lopuszanski et al. | 43/55 |
| 5,756,024 | 5/1998 | Huang | 264/113 |
| 5,849,152 | 12/1998 | Arnold et al. | 162/116 |
| 5,897,827 | 4/1999 | Chen | 264/460 |

FOREIGN PATENT DOCUMENTS

| | | |
|---|---|---|
| 87103134 | 11/1987 | China . |
| 1112579 | 11/1995 | China . |
| 1122343 | 5/1996 | China . |
| 0 786 496 A2 | 4/1996 | European Pat. Off. . |
| WO 96/01869 | 1/1996 | WIPO . |
| WO 96/06886 | 3/1996 | WIPO . |
| WO 97/00015 | 1/1997 | WIPO . |

OTHER PUBLICATIONS

German abstract of patent application DE 43 06 438 A1; Method of gluing together inorganic materials which contain vegetable fibers.

JP—Abstract—Pub No. 07112412 A; 05/284,162; filing date—Oct. 20, 1993; Artificial Wood.

JP—Abstract—Pub No. 08126888 A; 06/289,287; date of filing—Oct. 28, 1994; Carbon Electrode for Bipolar Fixed–Bed Water Treating Electrolytic Cell.

JP—Abstract—Pub No. 08154498 A; 06/332,109; date of filing—Dec. 12, 1994; Assorting Vessel for Plant Growth.

JP—Abstract—Pub No. 02222421 A; 01/041,518; date of filing—Feb. 23, 1989; Biodegradable Composite Material.

JP—Abtract—Pub No. 08311243 A; 07/141,291; date of filing—May 16, 1995; Biodegradable Foamable Composition Containing Starch Polymer.

European—Abstract—EP 0 753 541 A1.

*Primary Examiner*—Mary Lynn Theisen

*Attorney, Agent, or Firm*—Hall, Priddy, Myers & Vande Sande

[57] ABSTRACT

A degradable container is disclosed as containing 60 wt % to 70 wt % of a plant fiber, from 10 wt % to 30 wt % of an adhesive and from 0.1 wt % to 5 wt % of a demoulding agent, in which the adhesive is a modified urea-formaldehyde resin. A method of forming a degradable container is also disclosed as including the steps of (a) grinding a plant fiber to a size smaller than a pre-determined size; (b) mixing grounded plant fiber obtained under step (a) with a demoulding agent to form a premixed material; (c) mixing said premixed material with an adhesive into a powder form; (d) press-moulding said powder obtained under step (c) a first time under a pressure of 5–80 MPa; and (e) press-moulding said powder a second time under a pressure of 1.5–16 MPa into said container.

13 Claims, No Drawings

DEGRADABLE CONTAINER AND A METHOD OF FORMING SAME

This invention relates to a degradable container, especially a disposable degradable container for containing food or beverages. This invention also relates to a method of producing such a container.

BACKGROUND OF THE INVENTION

Disposable food containers made of non-degradable materials have been available for a long time, and the negative effects of disposal of such food containers have on the environment have been widely recognized. Various alternative materials have been proposed for the production of degradable disposable food containers, and it is an object of the present invention to provide a new disposable degradable food container which is more environmentally friendly and to provide a new method of forming such a food container.

SUMMARY OF THE INVENTION

According to a first aspect of the present invention, there is provided a degradable container comprising from 60 wt % to 70 wt % of a plant fibre, from 10 wt % to 30 wt % of an adhesive and from 0.1 wt % to 5 wt % of a demoulding agent, wherein said adhesive is a modified urea-formaldehyde resin.

According to a second aspect of the present invention, there is provided a method of forming a degradable container, comprising the steps of (a) grinding a plant fibre to a size smaller than a pre-determined size; (b) mixing grounded plant fibre obtained under step (a) with a demoulding agent to form a premixed material; (c) mixing said premixed material with an adhesive into a powder form; (d) press-moulding said powder obtained under step (c) a first time under a pressure of 5–80 MPa; and (d) press-moulding said powder a second time under a pressure of 1.5–16 MPa into said container.

DETAILED DESCRIPTION OF THE PREFERRED EMBODIMENTS

According to the present invention, plant fibre, e.g. rice husk, corncob, peanut shell, coconut shell, wheat husk, bagasses, cereal stalks, corn stalks or sorghum stalks, was placed into a crushing machine, e.g. a dry turbo crushing mill traded by WDJ under the model No. WDJ-350, which has a yield of roughly 500 kg/hour, for grinding. The plant fibre so grounded was then fed into a sieving machine, which was a ZSX series tri-vibratory sieving machine of Model ZSX900-2S and of a yield of roughly 850 kg/hour. The sieving criterion was set at 40-mesh. Grounded plant fibre which could not pass through a 40-mesh sieve was passed back into the dry crushing mill for re-grinding until all the particulate could pass through a 40-mesh sieve. "Mesh" (which may also be called "pore") is a scale for particulate material which represents the number of "pores" for every 25.4 mm (i.e. 1 inch) of a sieve. In this connection, the mesh (pore) number and the scale have the relationship as in Table 1 below:

TABLE 1

| Mesh (pore) number | Scale |
|---|---|
| 40 meshes | 0.45 mm |
| 60 meshes | 0.30 mm |
| 80 meshes | 0.21 mm |
| 100 meshes | 0.17 mm |
| 120 meshes | 0.13 mm |
| 180 meshes | 0.091 mm |
| 200 meshes | 0.077 mm |

Grounded plant fibre particulate which have passed through the sieving step were then mixed with the following ingredients:

(a) carboxymethyl cellulose (of a general chemical formula of $(C_6H_9O_4 \cdot OCH_2COOH)_n$ where n is a natural number) of up to 5 wt %, which acts as a viscosity increasing agent to increase the initial viscosity of the material;

(b) talc powder ($Mg_3(Si_4O_{10})(OH)_2$) of up to 5 wt %, which acts as a flow aid to increase the fluidity of the material in the mould cavity during the moulding procedure;

(c) calcium stearate ($[CH_3(CH_2)_{16}COO]_2Ca$) of 0.1 wt % to 5 wt %, which acts as a demoulding agent to promote the release of the resultant container from the mould cavity, and to smoothen the surface of the container;

(d) titanium dioxide ($TiO_2$) of 0.5 wt % to 3 wt %, which acts as a whitening agent to improve the whiteness of the container;

(e) starch (of a general formula of $(C_6H_{10}O_5)_n$ wherein n is a natural number) of up to 5 wt %, which acts as a modifying agent to improve the adhesive strength of the material, and also to increase the rate of degradation;

(f) polyvinyl butyral

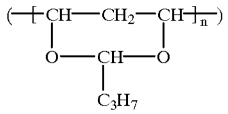

(where n is a natural number) of up to 5 wt %, which acts as a reinforcing agent to increase the tensile strength of the container, and to improve its other physical properties; and (g) water ($H_2O$) of up to 10 wt % to wet the ingredients and thereby to enhance stirring action, and to enhance the smoothness of the surface of the ultimate container.

The above ingredients and the grounded plant fibre were all fed into a rotating device for mixing at a speed of 500–1,300 r.p.m. (rounds per minute) for 2 to 5 minutes at a temperature of 30° C. to 50° C. Since heat was generated during the mixing procedure, no external heat was required to keep the temperature within the above range.

A modified urea-formaldehyde resin (to be further discussed below) was then added and the resultant solution was mixed by rotation at a speed of 2,500–3,600 r.p.m. for 10 to 25 minutes, and at a temperature of 50° C. to 80° C. The resultant material was then ready for use in the formation of the container. It may also be stored for future use. It is important to control the water content of the resultant material such that it falls within the range of 15 wt % to 22 wt %.

The resultant material obtained above was then introduced into a mould for subsequent moulding (thermosetting). The material was firstly pressed at a temperature of 100° C. to 200° C. and at a pressure of 5 to 80 MPa for 5 to 10 seconds. The pressure was then reduced to normal atmospheric pressure for 5 to 30 seconds. Since the material contained water, during the thermo-pressing process, the water vaporized. Reduction of the pressure to atmospheric pressure allowed such water vapour to be exhausted in time, thus preventing air bubbles from being trapped in the container.

The product was then re-pressed for a period of 5 to 30 seconds at a pressure of 1.5 MPa to 16 MPa, to form the final container. The mould was unloaded to allow the container to be retrieved therefrom. The mould was then cleaned for the next cycle of operation. The moulding procedure is in fact a curing process, under which the material was cured under pressure and temperature to form the container.

The basic criteria for the design of the mould are that the shape and dimension of the cavity of the mould should be identical to those of the container, the positioning of the mould should be reliable, the mould should be of sufficient strength, and the mould should have the necessary exhaust channel, and the necessary space for the overflow of surplus moulding material.

The container retrieved from the mould was then trimmed to cut off any unwanted parts, in order to standardize the shape of the product. The surface of the container was then coated with a film of water base terpolymer to enhance its resistance to heat and chemicals. The water base terpolymer is vinyl acetate-ethylene-acrylic acid copolymer, with cross-linking agent and silicone anti-foaming agent.

The vinyl acetate-ethylene-acrylic acid copolymer is of a general chemical formula of:

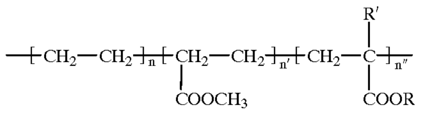

where n, n' and n" are all natural numbers, and R and R' may each stand for H, alkyl or other substituting groups. The cross-linking agent is methyl-triethoxy silicane ($CH_3Si[OC_2H_6]_3$). The silicone anti-foaming agent is siloxane emulsion of the general chemical formula of:

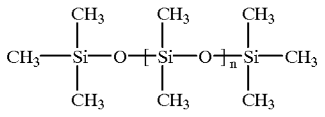

where n is a natural number.

The container was then dried in a stove for about 5 minutes, and subsequently packed in a sterilized environment. The room is a relatively sealed place subject to ultra-violet irradiation regularly to eliminate various bacteria in the air, in order to prevent pollution of the container during packaging.

A method of the manufacture of the modified urea-formaldehyde resin is demonstrated by Example 1 below.

EXAMPLE 1

Table 2 below shows the ingredients used in the manufacture of the modified urea-formaldehyde resin.

TABLE 2

| Ingredient | Quantity (grams) |
|---|---|
| Formaldehyde ($CH_2O$) | 1,280 |
| Urea ($CO(NH_2)_2$) | 800 |
| AB-1 (Trade Mark) | 50 |
| Trimeric cyanamide ($C_3N_6H_6$) | 50 |
| Hexamethylene-tetramine (urotopine) ($(CH_2)_6N_4$) | 30 |
| Caustic soda (NaOH) | Appropriate Amount |
| Aqueous ammonia ($NH_4OH$) | 100 |

1,280 grams of formaldehyde was mixed with 50 grams of hexamethylene-tetramine, and the solution was stirred. After 5 minutes of stirring, the pH value of the solution was determined. As the pH value was below 7.0, an appropriate amount of caustic soda was added to bring the pH value of the solution within the range of 7.0 to 7.5. 440 grams of urea was then added and the resultant solution was again stirred for 15 minutes. The temperature was subsequently increased and kept at about 65° C. for 15 minutes. The temperature was then increased to 90° C. to 95° C. The temperature was maintained within this range until the pH value of the solution reached 4.1 to 4.4. A sample of the solution was taken and put into clean water of room temperature, whereupon a white cloud appeared. An appropriate amount of caustic soda was then immediately added to bring the pH value to about 6.0. The temperature was promptly brought down to below 75° C., and the pH value of the solution was kept at 7.0 to 7.5 by addition of 50 grams of aqueous ammonia.

220 grams of urea was added and the solution was kept at a temperature of not lower than 65° C. for 20 minutes. When the temperature started to increase slowly, an additional 140 grams of urea was added and the solution was kept at a temperature of about 65° C. for another 10 minutes. The remaining aqueous ammonia was added to adjust the pH value of the solution to 8.8 to 9.0 and the solution was kept for 10 minutes. When the temperature was raised to 85° C., 50 grams of trimeric cyanamide was added. The solution was allowed to react for about 10 minutes while the pH value was kept at about 9.0. Vacuum dehydration was started when the temperature was raised to over 90° C. Vacuum dehydration was stopped when 400 ml was removed from the solution, and the solution was then cooled down. When the temperature fell below 50° C., 50 grams of AB-1 (Trade Mark) was added. The solution was stirred for 10 minutes, whereupon the resultant modified urea-formaldehyde resin was discharged for use in the present invention. Such a modified urea-formaldehyde resin is of the general chemical formula of:

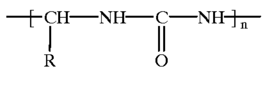

Where n is a natural number, and R stands for H, a hydroxyl group or an amino group.

AB-1 (Trade Mark) is a water-base epoxy resin traded by Chang Jiang Enterprise Company, of Jiang Men City, Guangdong Province, China, and acts as a formaldehyde absorbing agent.

The molar ratio of formaldehyde and urea should be low, such as:

formaldehyde: urea=1.2:1

When the formaldehyde reacted with the urea to produce urea-formaldehyde molecules, the reaction medium was formaldehyde. In the present example, although the molar ratio of formaldehyde was not high, there was still a surplus of 0.2M, which acted as the medium for the formation of urea-formaldehyde molecules.

Urea was added in several times to ensure that such reacted sufficiently with formaldehyde to form urea-formaldehyde molecules, in order to maximize the production of the modified urea-formaldehyde resin, and minimize the amount of any remaining free formaldehyde. Hexamethylene-tetramine was formed by reacting formaldehyde with aqueous ammonia, to ensure the pH value necessary for the reaction, and to consume any surplus free formaldehyde. The formation of hexamethylene-tetramine also guaranteed the stability of the urea-formaldehyde resin.

Vacuum dehydration was employed to facilitate the evaporation of surplus free formaldehyde after the completion of the reaction. Since formaldehyde is soluble in water, when the pressure in the system decreased, the vapour pressure equilibrium in the formaldehyde solution was broken, the volatility of formaldehyde decreased, and it was easy to overflow. Any surplus free formaldehyde was also absorbed by the AB-1 (Trade Mark).

The level of free formaldehyde in the above modified urea-formaldehyde resin is below 0.2%, as compared with 3% in commonly available urea-formaldehyde resin. This effect is achieved in part by the addition of AB-1, which acts as a formaldehyde absorbing agent.

Tables 3A to 3D below collectively show a total of fifteen examples of containers produced in accordance with the above invention.

TABLE 3A

| | Example 1 | | Example 2 | | Example 3 | | Example 4 | | Range of |
|---|---|---|---|---|---|---|---|---|---|
| | g/article | wt % | g/article | Wt % | g/article | wt % | g/article | wt % | wt % |
| Rice husk | 46.4 | 65.1 | 42.9 | 60.0 | 42.9 | 60.1 | 48.2 | 67.6 | 60.0–67.6 |
| Modified urea-form-aldehyde resin | 10.7 | 15.0 | 21.4 | 29.8 | 17.85 | 25.0 | 17.8 | 12.5 | 12.5–29.8 |
| Talc powder | 1.4 | 2.0 | 0 | 0 | 0.7 | 1.0 | 2.1 | 1.5 | 0–2.0 |
| Titanium dioxide | 0.7 | 1.0 | 2.1 | 2.9 | 2.1 | 2.9 | 2.1 | 1.5 | 1.0–2.9 |
| Starch | 3.6 | 5.1 | 0 | 0 | 0 | 0 | 0 | 0 | 0–5.1 |
| Calcium stearate | 1.4 | 2.0 | 1.47 | 2.0 | 1.07 | 1.5 | 0.4 | 0.3 | 0.3–1.0 |
| Carboxy-methyl cellulose | 0 | 0 | 0 | 0 | 0 | 0 | 0 | 0 | 0 |
| Polyvinyl butyral | 2.14 | 3.0 | 1.8 | 2.5 | 2.1 | 2.9 | 0.7 | 0.5 | 0.5–3.0 |
| Water | 4.9 | 6.88 | 2.14 | 3.0 | 4.64 | 6.5 | 0 | 0 | 0–6.88 |
| Calculated weight | 71.24 | 100 | 71.81 | 100 | 71.36 | 100 | 71.3 | 100 | |

TABLE 3B

| | Example 5 | | Example 6 | | Example 7 | | Example 8 | | Range of |
|---|---|---|---|---|---|---|---|---|---|
| | g/article | wt % | g/article | Wt % | g/article | wt % | g/article | wt % | wt % |
| Rice husk | 50 | 70.0 | 42.9 | 60.1 | 46.4 | 65.0 | 47.14 | 66.0 | 60.1–70.0 |
| Modified urea-form-aldehyde resin | 14 | 19.7 | 17.9 | 25.1 | 10.7 | 15.0 | 17.9 | 25.1 | 15.0–25.1 |
| Talc powder | 1.4 | 2.0 | 0.7 | 1.0 | 1.43 | 2.0 | 1.07 | 1.5 | 1.0–2.0 |
| Titanium dioxide | 2.1 | 3.0 | 2.1 | 2.9 | 0.7 | 1.0 | 1.07 | 1.5 | 1.0–3.0 |
| Starch | 0 | 0 | 2.1 | 2.9 | 3.6 | 5.0 | 2.1 | 2.9 | 0–5.0 |
| Calcium stearate | 1.4 | 2.0 | 1.07 | 1.5 | 1.43 | 2.0 | 1.43 | 2.0 | 1.5–2.0 |
| Carboxy-methyl cellulose | 0 | 0 | 0.36 | 0.5 | 0 | 0 | 0.36 | 0.5 | 0–0.5 |
| Polyvinyl butyral | 2.1 | 3.0 | 2.1 | 2.9 | 2.14 | 3.0 | 0.36 | 0.5 | 0.5–3.0 |
| Water | 0 | 0 | 2.1 | 2.9 | 5 | 7.0 | 0 | 0 | 0–7.0 |
| Calculated weight | 71 | 100 | 71.33 | 100 | 71.4 | 100 | 71.43 | 100 | |

TABLE 3C

| | Example 1 | | Example 2 | | Example 3 | | Example 4 | | Range of |
|---|---|---|---|---|---|---|---|---|---|
| | g/article | wt % | g/article | Wt % | g/article | wt % | g/article | wt % | wt % |
| Rice husk | 47.09 | 65.9 | 47.53 | 66.5 | 47.57 | 66.7 | 47.6 | 66.7 | 65.9–66.7 |
| Modified urea-form-aldehyde resin | 17.9 | 25.I | 14.29 | 20.0 | 15.7 | 22.0 | 17.9 | 25.1 | 20.0-25.1 |
| Talc powder | 0.7 | 1.0 | 1.43 | 2.0 | 0.7 | 1.0 | 0.7 | 1.0 | 1.0–2.0 |
| Titanium dioxide | 1.43 | 2.0 | 2.1 | 3.0 | 2.1 | 2.9 | 1.43 | 2.0 | 2.0–3.0 |
| Starch | 0 | 0 | 1.43 | 2.0 | 1.43 | 2.0 | 0.7 | 1.0 | 0–2.0 |
| Calcium stearate | 1.43 | 2.0 | 1.43 | 2.0 | 1.07 | 1.5 | 1.43 | 2.0 | 1.5–2.0 |
| Carboxy-methyl cellulose | 1.07 | 1.5 | 1.07 | 1.5 | 1.07 | 1.5 | 0.2 | 0.3 | 0.3–1.5 |
| Polyvinyl butyral | 1.8 | 2.5 | 2.14 | 3.0 | 1.71 | 2.4 | 1.43 | 2.0 | 2.0–3.0 |
| Water | 0 | 0 | 0 | 0 | 0 | 0 | 0 | 0 | 0 |
| Calculated weight | 71.42 | 100 | 71.42 | 100 | 71.35 | 100 | 71.39 | 100 | |

TABLE 3D

| | Example 13 | | Example 14 | | Example 15 | | Range of | Total range of |
|---|---|---|---|---|---|---|---|---|
| | g/article | wt % | g/article | wt % | g/article | wt % | wt % | wt % |
| Rice husk | 47.85 | 67.0 | 48.57 | 68.0 | 46.43 | 65.0 | 65.0–68.0 | 60.0–70.0 |
| Modified urea-form-aldehyde resin | 17.9 | 25.1 | 14.64 | 20.5 | 16.79 | 23.5 | 20.5–25.1 | 12.5–29.8 |
| Talc powder | 0.7 | 1.0 | 1.43 | 2.0 | 1.43 | 2.0 | 1.0–2.0 | 0–2.0 |
| Titanium dioxide | 1.43 | 2.0 | 2.1 | 2.9 | 2.1 | 2.9 | 2.12.9 | 1.0–3.0 |
| Starch | 0 | 0 | 0 | 0 | 0 | 0 | 0 | 0–5.1 |
| Calcium stearate | 1.43 | 2.0 | 1.07 | 1.5 | 1.07 | 1.5 | 1.5–2.0 | 0.3–2.0 |
| Carboxy-methyl cellulose | 1.07 | 1.5 | 1.8 | 2.5 | 1.8 | 2.5 | 1.5–2.5 | 0–2.5 |
| Polyvinyl butyral | 1.07 | 1.5 | 1.8 | 2.5 | 1.8 | 2.5 | 1.5–2.5 | 0.5–3.0 |
| Water | 0 | 0 | 0 | 0 | 0 | 0 | 0 | 0–7.0 |
| Calculated weight | 71.45 | 100 | 71.41 | 100 | 71.42 | 100 | | |

According to our research, there have not yet been very accurate or quantitative definitions for "degradation". In accordance with the results of various experiments carried out by us, the definition for "degradation" for our product is that in several months or days in the natural environment, through the agency of water, sunlight, moisture, micro-organisms, a product according to the present invention can soften, crack, reduce into powder form, decompose, and finally disperse and be absorbed into the soil, and again participates in the innocuous ecological cycle of nature.

Our experience indicates that a product according to the present invention will be softened in water at normal air temperature in 24 hours, totally softened in 48 hours, and totally dissolved in about 72 hours. On the other hand, it will be totally dissolved in boiling water in about 12 hours. In the case of degradation in the natural environment, through the agency of water, sunlight, moisture and micro-organisms, in 2 to 5 months' time, the container according to the present invention will soften, crack, be reduced into powder form, decompose, disperse and vanish in the soil.

During the whole course of the manufacture of the containers, from the selection of the materials to the degradation and vanishing thereof after use, there is no problem of solution. After degradation of the containers in soil, such elements as nitrogen, phosphorous and organic silicon are replenished.

Containers of the present invention may be bowls, dishes and cups for use in the fast food industry. The material used in the production of the containers may also be used as packaging materials, shock-proof materials for domestic electric appliances or other household utensils, construction materials, decoration materials, handrails of staircase, door planks, floor boards, furniture materials, toys for children, and pet appliances.

Some of the advantages of the present invention are:

a) the material is safe, non-toxic and environmentally friendly;

b) there are a large variety of sources of plant fibre suitable for use in the present invention, and their prices are low. Such plant fibre was previously treated as trash for disposal or burning, but can now be used for the production of useful utensils;

c) there is no problem of contamination or pollution associated with the degradation of the containers obtained in the present invention.

After use and disposal of the containers, they may be reclaimed and reused. If some nutritive matters are added in, they can also be used as fodder for livestock and domestic fowls.

What is claimed is:

1. A method of forming a degradable container, comprising the steps of:

(a) grinding a plant fibre to a size smaller than a predetermined size;

(b) mixing grounded plant fibre obtained under step (a) with a demoulding agent to form a premixed material;

(c) mixing said premixed material with an adhesive into a powder form;

(d) press-moulding said powder obtained under step (c) a first time under a pressure of 5–80 MPa;

(e) press-moulding said powder a second time under a pressure of 1.5–16 MPa into said container.

2. A method according to claim 1 wherein after grinding of said plant fibre to a size smaller than said pre-determined size, a pigment agent is added.

3. A method according to claim 2 wherein said pigment agent is titanium dioxide.

4. A method according to claim 1 wherein said grounded plant fibre obtained under step (a) is mixed with said demoulding agent at a rotational speed of 500 to 1,300 r.p.m. (rounds-per-minute) for 2 to 5 minutes and at a temperature of 30° C. to 50° C.

5. A method according to claim 1 wherein said premixed material obtained under step (b) is mixed with said adhesive at a rotational speed of 2,500 to 3,600 r.p.m. for 10 to 25 minutes and at a temperature of 50° C. to 80° C.

6. A method according to claim 1 wherein in step (d), said powder is press-moulded at 100° C. to 200° C. for 5 to 10 seconds.

7. A method according to claim 6 wherein said powder is press-moulded at 110° C. to 150° C.

8. A method according to claim 6 further comprising the step of, between steps (d) and (e), depressurization to allow gas formed in step (d) to escape from the container.

9. A method according to claim 1 further comprising the steps of:

(f) coating said container with a water base terpolymer;

(g) drying said container; and (h) packing said container in a sterilized environment.

10. A method according to claim 9 wherein said water base terpolymer is vinyl acetate-ethylene-acrylic acid co-polymer.

11. A method according to claim 10 wherein a cross-linking agent and a silicone anti-foaming agent are added.

12. A method according to claim 9 wherein said container is dried in a stove for substantially five minutes.

13. A method according to claim 1 wherein said adhesive is a modified urea-formaldehyde resin.

* * * * *

UNITED STATES PATENT AND TRADEMARK OFFICE

CERTIFICATE OF CORRECTION

PATENT NO : 6,074,587

DATED : June 13, 2000

INVENTOR(S) : Liu, et al.

It is certified that error appears in the above-identified patent and that said Letters Patent are hereby corrected as shown below:

On the cover, under "Assignee," please replace "Enviromental" with --Environmental--.

Signed and Sealed this

Tenth Day of April, 2001

Attest:

Nicholas P. Godici

NICHOLAS P. GODICI

*Attesting Officer* *Acting Director of the United States Patent and Trademark Office*